United States Patent

[11] 3,557,962

| [72] | Inventor | Arthur L. Kohl |
| | | Woodland Hills, Calif. |
| [21] | Appl. No. | 740,867 |
| [22] | Filed | June 28, 1968 |
| [45] | Patented | Jan. 26, 1971 |
| [73] | Assignee | North American Rockwell Corporation |

[54] REVERSE OSMOSIS FABRIC
8 Claims, 9 Drawing Figs.

[52] U.S. Cl.................................................. 210/321,
210/500
[51] Int. Cl.................................................. B01d 31/00
[50] Field of Search.......................................... 210/23,
321, 444, 447.1, 500, 506, 507, 508; 55/16, 158

[56] References Cited
UNITED STATES PATENTS
3,342,724 9/1967 Strand.......................... 210/321X
3,401,798 9/1968 Nyrop.......................... 210/321

*Primary Examiner*—Frank A. Spear, Jr.
*Attorneys*—William R. Lane and H. Fredrick Hamann ABSTRACT: An improved reverse osmosis fabric having hollow fibers arranged in a predetermined pattern, either woven or nonwoven, that is relatively flexible yet provides a stable fabric configuration.

PATENTED JAN 26 1971 3,557,962

INVENTOR.
ARTHUR L. KOHL
BY Donald J. Ellingsberg

REVERSE OSMOSIS FABRIC

CROSS-REFERENCE TO RELATED APPLICATION

Copending application: Ser. No. 740,868 "Reverse Osmosis Module Having Spirally Wrapped Reverse Osmosis Membrane Fabric," Arthur L. Kohl; filed even date herewith and assigned to the same assignee as the present invention.

BACKGROUND OF THE INVENTION

The need for water in the world is basic. To satisfy this need, appropriate emphasis is being placed on developing processes that will economically produce pure water from sea water, or from other saline or brackish waters.

One process that produces pure water is the reverse osmosis process. When saline water and pure water are separated by a semipermeable membrane, osmosis creates a flow of pure water through the membrane into the saline water. If the saline water is subjected to a pressure greater than the natural osmotic force, the process is reversed and pure water in the saline water is forced through the membrane to the pure water side, leaving concentrated salts behind.

Desalination systems using the reverse osmosis process can be economical for saline water conversion because of simplicity and the near approach to an ideal thermodynamic system. A reverse osmosis system that will produce a product fluid such as pure water at a cost low enough to make it economically attractive will require efficient reverse osmosis membranes and/or membrane structures. The membranes should provide a maximum surface area per unit volume with a long operating life.

Hollow reverse osmosis fibers represent a near-optimum configuration for reverse osmosis systems because the eliminate the need for backing material or plates, minimize sealing requirements, and provide a very large surface to volume ratio. A considerable amount of work has been done (and continues) on hollow fiber technology.

One reverse osmosis system uses hollow fibers in an operational system. This system has millions of small diameter hollow fibers, e.g., 25 to 250 microns outside diameter with a wall thickness of 5 to 50 microns, that are suitably retained as a tube-sheet bundle of parallel-oriented fibers. (See Design News, July 19, 1967, p. 18.) The parallel orientation of the fibers in the bundle increases the concentration polarization effect[1] and increases the hydraulic losses experienced by the product fluid flow through the hollow fibers when the bundle is formed from relatively long fibers; extended fiber lengths are required in the parallel orientation of the tube-sheet bundle to optimize the system configuration and minimize tube sheet requirements, and to develop the desired maximum working surface area per unit volume.

OBJECTS OF THE INVENTION

Accordingly, it is an object of the invention to provides a new and improved reverse osmosis fabric.

It is an object of the invention to provide a reverse osmosis fabric that substantially minimizes a concentration polarization during operation.

It is an object of the invention to provide a reverse osmosis fabric that substantially reduces product fluid pressure losses during operation.

It is an object of the invention to provide a reverse osmosis fabric that is inherently strong and requires little or no additional support or backing material.

It is an object of the invention to provide a reverse osmosis fabric that produces a high quality product fluid during operation.

---
[1]. The salinity of a feed fluid layer adjacent the outer working surface of a reverse osmosis membrane will increase as a product fluid passes from the feed fluid through the membrane. Osmotic pressure must then be increased to overcome this concentration polarization effect and maintain the flow of the product fluid through the membrane. Where the reverse osmosis membranes are millions of hollow fibers oriented in a parallel relationship in an extended tubular container, the flow of feed fluid parallel to the individual fiber surfaces increases the concentration polarization effect.

SUMMARY OF THE INVENTION

Briefly, in accordance with one form of the invention, a new and improved reverse osmosis fabric is provided having warp fibers and hollow woof fibers woven into a stable fabric configuration; each of the hollow woof fibers has a permeable wall defining a longitudinally extending fluid channel. The permeable wall is in fluid contact with a pressurized feed fluid and is adapted to pass a product fluid forced from the feed fluid in a predetermined direction through the wall. Other forms of woven and nonwoven fabrics are also provided having selected hollow fibers.

While the specification concludes with claims particularly pointing out and distinctly claiming the subject matter which may be regarded as the invention, the organization and method of operation together with further objects, features, and the attending advantages thereof, may best be understood when the following description is read in connection with the accompanying drawing.

DESCRIPTION OF THE INVENTION

Woven Reverse Osmosis Fabrics

Figure 1:
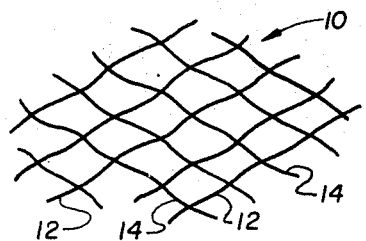
FIG. 1 is a perspective and schematic view of one form of reverse osmosis fabric formed in accordance with the invention.
Figure 2:
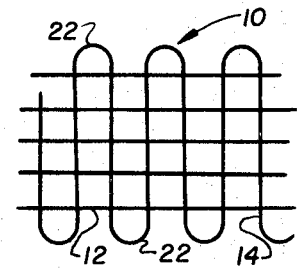
FIG. 2 is a schematic plan view of a reverse osmosis fabric having a right-angle weave.

Referring to FIG. 1, one form of reverse osmosis fabric 10 having a relatively stable fabric configuration is woven in a predetermined arrangement or weave pattern with warp or support fibers 12 and woof fibers 14. The reverse osmosis fabric 10 can have a weave pattern such as a "right-angle" weave as shown by FIG. 2, which is similar to a plain cloth weave where the warp fibers provide the lengthwise support for the crossing woof fibers. The reverse osmosis fabric as contemplated can have other weave patterns. For example, the "bias" weave fabric 16 as shown by FIG. 3, or the "mesh" weave fabric 18 as shown by FIG. 4, or other conventional cloth weave patterns.

Figure 5:
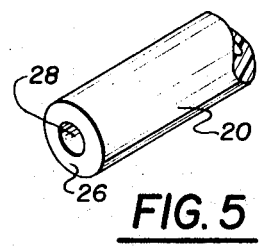
FIG. 5 is an enlarged perspective view of a hollow reverse osmosis fiber used in the fabrics as shown.

In the right-angle weave pattern 10 of FIG. 2, the woof fibers 14 of the reverse osmosis fabric are formed from a hollow working fiber 20 as shown by FIG. 5 and described hereinafter. The woof fibers 14 can be continuous hollow fibers that are bent in a generally serpentine arrangement through about 180° bends at the fabric edge into similar bights 22 during a weaving process. The warp and woof fibers 12 and 14 are interwoven with interconnected adjoining fiber portions in the weave pattern of FIG. 2. It is contemplated that the woof fibers 14 can be individual hollow fibers positioned in a parallel array rather than the serpentine arrangement with the raw or open ends suitably sealed as required. It is also contemplated that the warp fibers 12, in addition to the woof fibers 14, can be formed from hollow fibers, such as hollow fiber 20.

Figure 3:
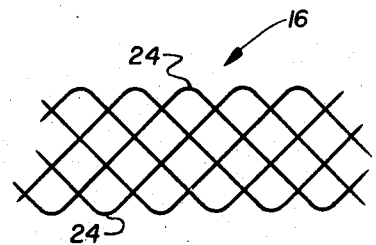
FIG. 3 is a schematic plan view of another reverse osmosis fabric having a bias weave.
Figure 4:
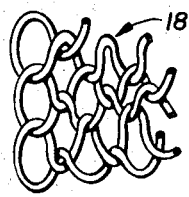
FIG. 4 is a schematic plan view of another reverse osmosis fabric having a mesh weave.

In the bias weave pattern 16 of FIG. 3 and in the mesh weave pattern 18 of FIG. 4, the interwoven fibers are preferably all hollow fibers like fiber 20 of FIG. 5. However, it is contemplated that selected ones of the fibers in the bias weave pattern 16 or in the mesh weave pattern 18 could be solid so that functionally the solid fibers would serve as support fibers. The fibers in the bias weave pattern are bent through 90° bends into similar bights 24 at the fabric edge during a weaving process.

Any raw edges that remain after a weaving process in either the right-angle weave 10 of FIG. 2, the bias weave 16 of FIG. 3, or the mesh weave 18 of FIG. 4 can be suitably sealed, thus forming a finished edge.

The hollow reverse osmosis fiber 20, that is used in the fabrics of my invention, is shown by FIG. 5. Fiber 20 can be a conventional hollow reverse osmosis fiber formed from a variety of polymeric materials. In one commercially available form, the hollow fiber 20 has an outside diameter range from 25 to 250 microns with a permeable wall 26 that has a thickness of 5 to 50 microns such as described hereinbefore. The inner surface of the hollow fiber wall 24 defines a longitudinally extending fiber channel 28.

Operatively, the reverse osmosis fabric of the invention can find a variety of uses as a stable fabric in reverse osmosis systems. It will be beneficial for a clear understanding of my invention to briefly consider, for example, how the right-angle weave fabric 10 of FIG. 2 and the bias weave fabric 16 of FIG. 3 can be used in such a system.

Figure 6:
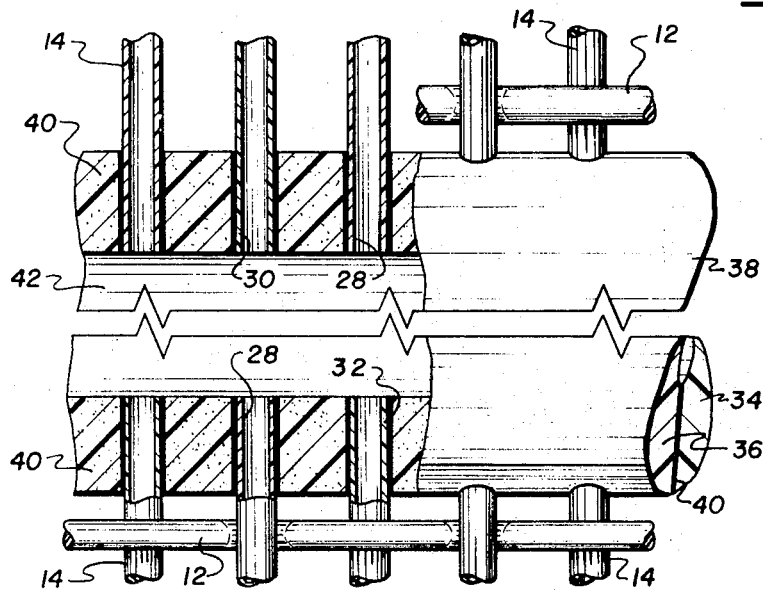
FIG. 6 is an enlarged, sectional view, partly broken away of the fabric of FIG. 2 in an operational arrangement.

In FIG. 6 the reverse osmosis fabric has the right-angle weave pattern 10 as shown by FIG. 2 with the warp fibers 12 formed from solid fibers and the woof fibers 14 formed from hollow fibers such as the hollow fiber 20 as shown by FIG. 5. The woof fibers 14 of the fabric are cut and the exposed fiber ends 30 and 32 are positioned between the complementary parts 34 and 36 of a longitudinally split tube 38. The fiber ends 30 and 32 and the tube parts 34 and 36 are sealed together by a suitable bonding material such as an epoxy resin 40 so that the ends 30 and 32 and the tube parts 34 and 36 form a fluidtight structure. Thus sealed, the similar fiber channels 28 of the hollow woof fibers 14 are in fluid communication with a tube channel 42 as defined by the assembled parts 34 and 36 that form the tube 38.

A product fluid is recovered from the operational arrangement of the reverse osmosis fabric as shown by FIG. 6 when, in one operating mode, a pressurized feed fluid contacts the outer surfaces of the warp and woof fibers 12 and 14, respectively. A product fluid forced from the feed fluid passes through the similar walls 26 to the fiber channels 28 where the product fluid collects and is directed through the cut fiber ends 30 and 32 to the tube channel 42. It is contemplated that a reverse flow pattern could be used where the feed fluid passes from the tube channel 42 through the cut fiber ends 30 and 32 into the similar fiber channels 28. The product fluid then passes through the similar walls 26 to the outer surface of the woof fibers 14 where the product fluid collects. The product fluid is in fluid contact with the outer surfaces of the warp and woof fibers 12 and 14, respectively.

Figure 7:
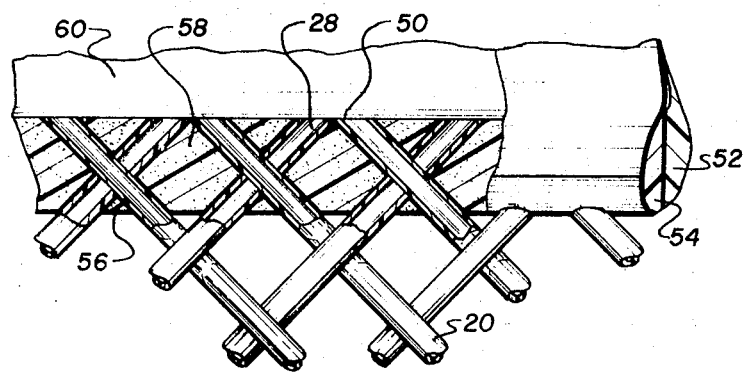
FIG. 7 is an enlarged, sectional view, partly broken away of the fabric of FIG. 3 in an operational arrangement.

In FIG. 7, the reverse osmosis fabric has the bias weave pattern 16 as shown by FIG. 3 with all or selected ones of the fibers formed from hollow fibers such as the hollow fiber 20 as shown by FIG. 5. The fabric is cut and the exposed fiber ends 50 are potted between the complementary parts 52 and 54 of a tube 56 by a suitable epoxy resin 58 that seals the cut fiber ends and the tube parts into a fluidtight structure. The similar fiber channels 28 are exposed by the cut fiber ends 50 and are in fluid communication with a tube channel 60 that is defined by the assembled parts 52 and 54 that form the tube 56.

A product fluid is recovered from the operational arrangement of the reverse osmosis fabric as shown by FIG. 7 in a manner similar to that described for the operational arrangement as shown by FIG. 6.

Concentration polarization is minimized by the reverse osmosis fabric in the operational modes as described since the pressurized feed fluid flow is maintained in a turbulent flow condition rather than in a laminar flow condition by the particular fabric weave pattern. The right-angle, bias, and mesh weave patterns as shown by FIGS. 1, 2, 3, and 4, respectively, and as described, do not permit the feed fluid to flow in parallel with a fiber outer surface for any extended distance without encountering a cross fiber that interrupts such a parallel or laminar flow pattern. This interruption ensures that the undesirable concentration polarization effect is substantially minimized if not totally eliminated.

By design, hydraulic losses of a product fluid can also be substantially reduced dependent upon the length of the hollow working fibers; for example, the relatively short length of the hollow woof fibers 14 in the right-angle weave pattern 10 of FIG. 2 when placed in the operating mode as shown by FIG. 6 minimizes hydraulic losses because of the relatively short product fluid flow path through the hollow working fibers to the tube channel.

Thus, a reverse osmosis fabric has the advantages, inter alia, of (1) minimizing the concentration polarization effect during operation of a reverse osmosis system using the fabric as described, and (2) minimizing hydraulic pressure losses, particularly of the product fluid; both of these desirable advantages enable the reverse osmosis system to operate with lower system pressures.

The tubes 38 and 56 as shown by FIGS. 6 and 7, respectively, can be formed where desirable by filament winding or otherwise building up the tube configuration so that a resulting tube channel is in fluid communication with the hollow fibers of the particular reverse osmosis fabric; or can be formed by coring a solid rod that secures the reverse osmosis fabric so that the cored rod defines a tube channel that is in fluid communication with the hollow fibers of the fabric; or the like.

Nonwoven Reverse Osmosis Fabrics

Figure 8:
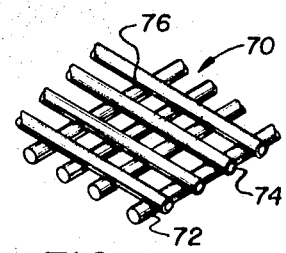
FIG. 8 is a perspective view of another form of reverse osmosis fabric that is nonwoven.

Referring to FIG. 8, one form of nonwoven reverse osmosis fabric 70 has warp or support fibers 72 and woof fibers 74. It is contemplated that a nonwoven reverse osmosis fabric can also have a plurality of fibers suitably connected together in a predetermined nonwoven arrangement or array where the warp and woof fibers may not be identifiable as such. In the form of nonwoven fabric 70, the warp fibers 72 are solid while the woof fibers 74 are hollow fibers such as hollow fiber 20 as shown by FIG. 5 and as described. The warp fibers 72 and the woof fibers 74 are bonded together into a stable fabric configuration by a suitable bonding material such as an epoxy resin that forms similar bond joints 76 at the adjoining portions of the warp and woof fibers, i.e., where the warp and woof fibers cross. It is contemplated that the warp fibers 72 can be arranged in separate and adjacent planes spaced-apart by the crossing woof fibers 74; similarly, the woof fibers can be arranged in separate and adjacent planes.

Figure 9:
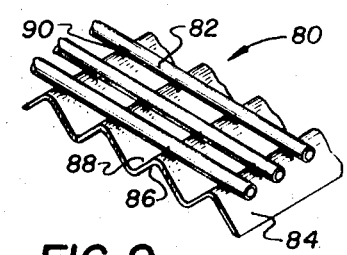
FIG. 9 is a perspective view of another form of reverse osmosis fabric that is nonwoven.

Another form of reverse osmosis fabric 80 having a nonwoven fiber array is shown by FIG. 9. Hollow reverse osmosis fibers 82 are bonded by a suitable bonding material such as an epoxy resin to a generally nonplanar corrugated member 84 that has similar ridges 86 and grooves 88 oriented generally transverse to the hollow fibers. The hollow fibers 82 are bonded to the ridges 86 by the epoxy resin at similar bond joints 90. It is contemplated that the corrugated member 84 can be formed from a flexible plastic, or polymeric material, or the like.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

I claim:

1. A nonwoven fabric for a reverse osmosis system that collects a product fluid from a pressurized feed fluid, the fabric comprising hollow reverse osmosis fiber means suitably positioned in a predetermined arrangement so that a stable fabric configuration results, said fiber means defining a permeable wall in fluid contact with the feed fluid and adapted to pass a product fluid forced from the feed fluid in a predetermined direction through said wall.

2. A nonwoven fabric for a reverse osmosis system that collects a product fluid from a pressurized feed fluid, the fabric comprising:
   a. first hollow reverse osmosis fiber means defining a permeable wall means in fluid contact with the system feed fluid and adapted to pass a product fluid forced from the feed fluid in a predetermined direction through said wall means; and
   b. second fiber means cooperating with said first fiber means and suitably positioned in a predetermined arrangement with said first fiber means, said first and second fiber means having adjoining portions suitably connected so that a stable fabric configuration results.

3. The fabric of claim 2 in which said first fiber means is a hollow woof fiber and said second fiber means is a solid warp fiber.

4. A nonwoven fabric for a reverse osmosis system that collects a product fluid from a pressurized feed fluid, the fabric comprising a hollow reverse osmosis fiber means, and a nonplanar flexible member cooperating with said fiber means, said fiber means connected to said flexible member so that a stable fabric configuration results, said fiber means defining a permeable wall in fluid contact with the feed fluid and adapted to pass a product fluid forced from the feed fluid in a predetermined direction through said wall.

5. The fabric of claim 4 in which said nonplanar flexible member is corrugated and defining substantially parallel ridges and grooves oriented generally transverse to said fiber means.

6. The fabric of claim 5 in which said nonplanar flexible member is formed from a polymeric material.

7. The fabric of claim 5 in which said fiber means are connected to said nonplanar flexible member by means of a resin bonding material.

8. The fabric of claim 7 in which the bonding material is an epoxy resin.

PO-1050
(5/69)

UNITED STATES PATENT OFFICE
CERTIFICATE OF CORRECTION

Patent No. 3,557,962      Dated January 26, 1971

Inventor(s) Arthur L. Kohl

It is certified that error appears in the above-identified patent and that said Letters Patent are hereby corrected as shown below:

Under "References Cited - United States Patents", "3,342,724" should read --3,342,729--

Column 1, line 34, "the" should read --they--

Column 1, line 56, "provides" should read --provide--

Signed and sealed this 25th day of May 1971.

(SEAL)
Attest:

EDWARD M. FLETCHER, JR.      WILLIAM E. SCHUYLER, JR.
Attesting Officer      Commissioner of Patents